UNITED STATES PATENT OFFICE.

HUGO GALLINOWSKY, OF PHILADELPHIA, PENNSYLVANIA, ASSIGNOR OF ONE-HALF TO WILLIAM MAGUIRE, OF TORONTO, CANADA.

COMPOSITION FOR AN ACID-PROOF CEMENT.

SPECIFICATION forming part of Letters Patent No. 723,263, dated March 24, 1903.

Application filed October 29, 1902. Serial No. 129,324. (No specimens.)

*To all whom it may concern:*

Be it known that I, HUGO GALLINOWSKY, a citizen of the United States, residing at Philadelphia, in the county of Philadelphia and State of Pennsylvania, have invented a certain new and useful Improved Composition for an Acid-Proof Cement, of which the following is a specification.

This invention relates to an improved composition for a cement which is acid and fire proof and is adapted to be used as a coating or covering for various articles and purposes—such, for instance, as for lining tanks containing oils or other liquids which have a percentage of acids or localities which are exposed to acid-fumes.

The composition consists of a vegetable or mineral fiber, such as wood-dust or asbestos, which is preferably in a finely-divided state and is impregnated with about equal proportions, by weight, of magnesium chlorid and silicic acid, the resulting product being dried by the application of heat to render the chemicals anhydrous and then mixed with a basic cement in powdered form, such as calcined magnesite. For some purposes the fibrous material may be impregnated with silicic acid only, which will produce a better quality of cement, but more expensive.

The purpose of the silicic acid is to render the composition acid-proof, so that it may be used for coating, covering, or lining various articles exposed to or containing liquid with a percentage of acid.

The cement is also fireproof and comparatively cheap and durable.

In using this cement it is mixed with a proper amount of water and applied with a trowel or other implement to the article or surface to be coated, covered, or lined.

I claim as my invention—

1. An acid-proof cement consisting of a fibrous material impregnated with magnesium chlorid and silicic-acid anhydrate combined with a basic cement, substantially as set forth.

2. An acid-proof cement consisting of a fibrous material, about equal parts of magnesium chlorid, and silicic acid and a basic cement, the fibrous material being impregnated with the magnesium chlorid and silicic acid and dried under heat to render the chemicals anhydrate and then mixed with the basic cement, substantially as set forth.

HUGO GALLINOWSKY.

Witnesses:
GEO. A. NEUBAUER,
CHARLES PANKOW.